United States Patent
Van Gilst et al.

[19]

[11] Patent Number: 6,106,053
[45] Date of Patent: Aug. 22, 2000

[54] ROTOMOLDED LUGGAGE CONTAINER WITH PERIMETRICAL T-SLOT

[75] Inventors: Carl W. Van Gilst, P.O. Box 123, Goshen, Ind. 46527; Ronald E. Kish, 51515 W. Saddlebag Lake Rd., Decatur, Mich. 49045

[73] Assignees: Carl W. Van Gilst, Goshen, Ind.; Ronald E. Kish, Decatur, Mich.

[21] Appl. No.: 09/007,092

[22] Filed: Jan. 14, 1998

[51] Int. Cl.[7] .................................................. B60R 5/00
[52] U.S. Cl. .................. 296/178; 296/37.1; 220/344; 224/544
[58] Field of Search .................. 296/178, 37.1; 220/1.5, 344; 224/401, 281, 282, 400, 542, 544; 264/310, 311

[56] References Cited

U.S. PATENT DOCUMENTS

| 5,538,158 | 7/1996 | Prout et al. | 264/310 X |
| 5,922,267 | 7/1999 | Brescia et al. | 264/310 |

FOREIGN PATENT DOCUMENTS

| 3830792 | 5/1989 | Germany | 220/1.5 |

*Primary Examiner*—D. Glenn Dayoan
*Assistant Examiner*—Jason Morrow
*Attorney, Agent, or Firm*—Wendell E. Miller

[57] ABSTRACT

A vehicle and luggage box assembly (40) includes a vehicle (42) and a luggage box (44). The luggage box (44) includes an open-ended chamber (61) with a flange (62) that extends perimetrically around an open end (49). A perimetrical chamber (66) is molded inside the flange (62). A perimetrical groove (68) is cut through the flange (62) and into the perimetrical chamber (66), thereby forming a perimetrical T-slot (70). A resilient gasket (72) is inserted perimetrically into the perimetrical T-slot (70), and a door (48) of the vehicle (42) closes against the resilient gasket (72). The molding process forms two separate chambers (66 and 94) in a single mold (100) by constructing a throat opening (122) with a dimension (120) that results in bridging across the throat opening (122), and that thereby results in the perimetrical chamber (66) being isolated from the closed chamber (94). Subsequently, removal of a web (92) transforms the closed chamber (94) into the open-ended chamber (61).

12 Claims, 2 Drawing Sheets

6,106,053

ROTOMOLDED LUGGAGE CONTAINER WITH PERIMETRICAL T-SLOT

BACKGROUND OF THE INVENTION

The present invention relates generally to storage containers with hinged lids. More particularly, the present invention pertains to luggage containers with hinged lids for mounting to vehicles.

FIELD OF THE INVENTION

Motor vehicles that carry passengers often need to carry travel luggage. In many smaller motor vehicles, this need has been met by including a trunk with a hinged lid. In contrast, in vans, whether as manufactured at the factory, or as converted by a specialized shop, this need has largely been ignored.

However, in larger motor vehicles, such as house-cars, airport limousine busses, and cross-country busses, hinged luggage containers have been included. These luggage containers have been disposed transversely under the passenger seating compartment.

These luggage containers, being disposed only a small distance above pavement level and between front and back wheels, are subjected to dirt, mud, rain, snow, ice, and salt. Therefore, sealing between the luggage container and its door is critical. In prior-art designs in which a gasket has been needed between the luggage box and the vehicle frame, problems in sealing have been compounded.

In typical prior-art designs of modern construction, hinged luggage containers for use under house-cars and busses have consisted of a polyethylene luggage box that is attached inside longitudinally disposed members of the vehicle body with a gasket between the luggage box and one of the longitudinally disposed members, and a hinged door with a gasket attached thereto. That is, one gasket has been used to seal between the luggage box and the vehicle body, and a second gasket has been used to seal between the vehicle body and the hinged door.

SUMMARY OF THE INVENTION

In the present invention, a polyethylene luggage box of a generally rectangular shape includes an open end, a closed end, a top, a bottom, and two sides. The luggage box also includes a perimetrical flange that extends outwardly from the floor, sides, and top, and that has a flange face that is generally parallel to the open end. A T-slot is disposed in the flange and opens through the flange face.

A perimetrical gasket, having an inwardly disposed T-shaped portion and an outwardly disposed tubular-shaped portion is inserted into the T-shaped groove with the tubular-shaped portion disposed outside the T-groove.

Unlike prior-art designs in which a perimetrical flange has extended inwardly of the luggage box, and the luggage box has been disposed inside the vehicle body, in the present invention, the perimetrical flange is disposed outside the vehicle body and extends outwardly. Because the perimetrical flange is disposed outside the vehicle body, only one gasket is required—a gasket between the luggage box and the luggage door.

Further, because the perimetrical flange extends outwardly of the open end, it is not necessary to lift luggage over the flange, as is the case with prior-art luggage boxes in which the perimetrical flange extends inwardly.

The luggage box is rotationally molded as two enclosed chambers. One of the chambers is the luggage box, and, as molded, the luggage box includes a web, or wall, that is removed after the molding process. The other chamber is a perimetrical chamber, and it is disposed inside and perimetrically around the perimetrical flange. After molding, a perimetrical slot is cut into the face of the perimetrical flange and extends into the perimetrical chamber, thereby cooperating with the perimetrical chamber to form a T-slot that extends perimetrically around the open end of the luggage box.

In a first aspect of the present invention, a method is provided for making a container with a perimetrical T-slot surrounding an open end thereof, which method comprises rotationally molding first walls that enclose a first chamber; rotationally molding second walls that enclose a perimetrical chamber that is juxtaposed to, but sealed from, the first chamber; opening an end of the first chamber proximal to the perimetrical chamber; and perimetrically slotting the perimetrical chamber.

In a second aspect of the present invention, a method is provided for making a container with a perimetrical gasket surrounding an open end thereof, which method comprises rotationally molding first walls that enclose a first chamber; rotationally molding second walls that enclose a perimetrical chamber that is juxtaposed to, but sealed from, the first chamber; opening an end of the first chamber proximal to the perimetrical chamber; perimetrically slotting the perimetrical chamber; and inserting a gasket perimetrically into the slot.

In a third aspect of the present invention, a method is provided for making a container with a perimetrical T-slot surrounding an open end thereof, which method comprises rotationally molding walls that enclose a single chamber; perimetrically bridging the single chamber into a larger chamber and a perimetrical chamber that are sealingly isolated from each other; and perimetrically slotting the perimetrical chamber.

In a fourth aspect of the present invention, a rotationally-molded container comprises: an open-ended chamber having a top wall, a bottom wall, side walls, a closed-end wall, and an open end with a perimetrical flange that extends radially outward from the top, bottom, and side walls, the improvement which comprises: a rotationally-molded chamber being perimetrically enclosed in the flange and being isolated from the open-ended chamber; and a T-slot, comprising the rotationally-molded chamber and a groove that opens perimetrically through the flange and into the rotationally-molded chamber.

DESCRIPTION OF THE PREFERRED EMBODIMENTS

Figure 1:
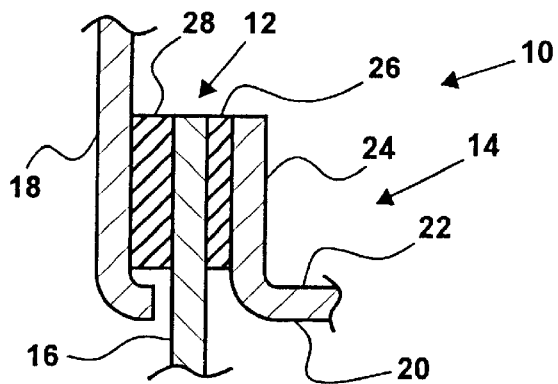
FIG. 1 is a partial cross-sectioned elevation, taken from a front of a vehicle, of a prior-art luggage box as installed in a vehicle, showing the luggage box installed inside a vehicle frame with a gasket therebetween, and showing a second gasket attached to a hinged door for sealing between the hinged door and the vehicle frame.

Referring now to FIG. 1, in a prior-art design, a vehicle and luggage box assembly 10 includes a vehicle 12, a luggage box 14, a vehicle body 16, and a hinged luggage door 18. The luggage box 14 includes a floor 20 with a floor surface 22, and a flange 24 that extends upwardly from the floor surface 22.

A first gasket 26 is disposed between the flange 24 and the vehicle body 16 to seal therebetween, and the flange 24 is attached to the vehicle body 16 by any suitable means, not shown. A second gasket 28 is attached to the luggage door 18 for sealing between the luggage door 18 and the vehicle body 16.

Disadvantages of this prior-art design include: the necessity of lifting luggage (not shown) over the flange 24, and the necessity of using two gaskets, 26 and 28. The gasket 28 is provided to seal between the luggage door 18 and the vehicle body 16, and the gasket 26 is provided to seal between the vehicle body 16 and the luggage box 14.

Figure 2:
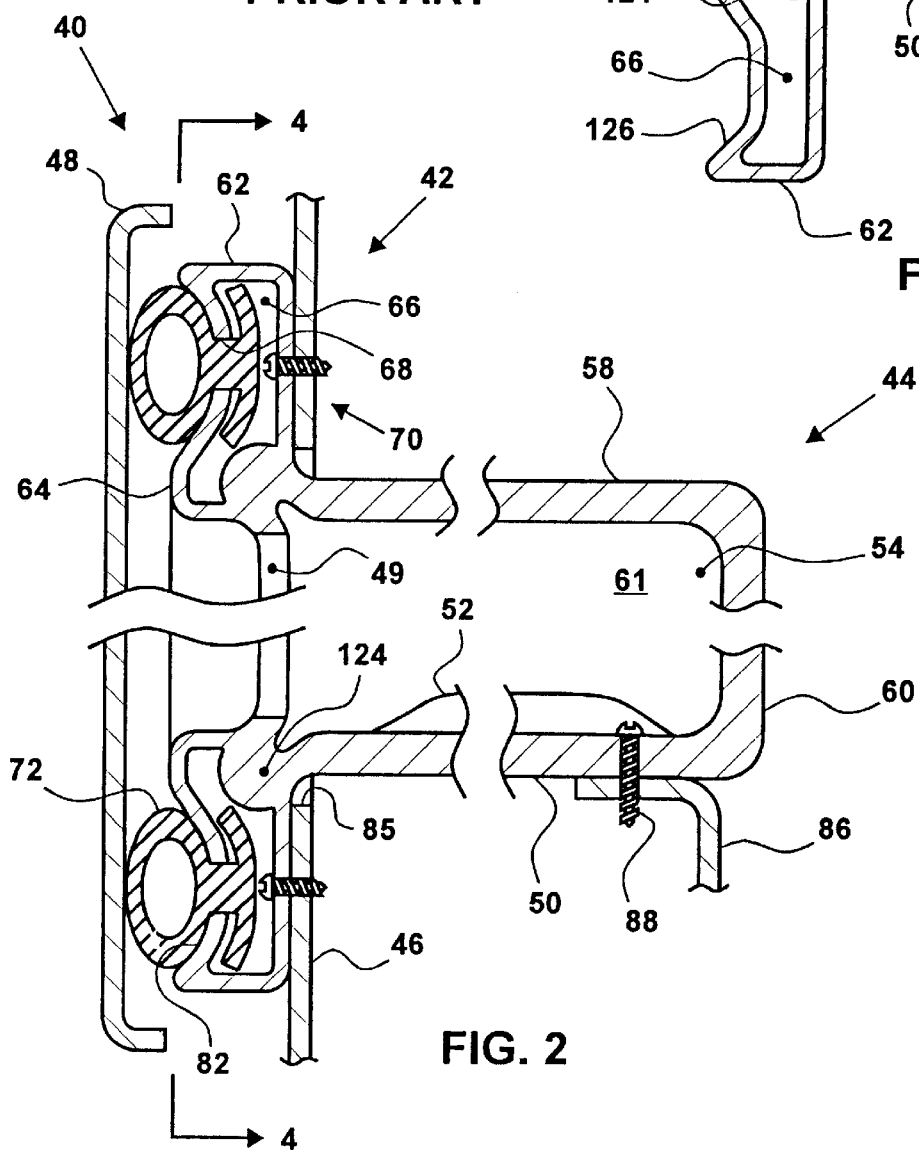
FIG. 2 is a partial cross-sectioned elevation, taken substantially the same as FIG. 1, of a preferred embodiment of the present invention as installed in a vehicle, showing the luggage box with the outwardly extending flange extending over the vehicle frame and downwardly outside the vehicle frame, showing the T-shaped part of the gasket installed in the T-slot, and showing the tubular/portion of the gasket engaging the luggage door.

Referring now to FIG. 2, in a preferred embodiment of the present invention, a vehicle and luggage box assembly 40 includes a vehicle 42, a rotationally molded plastic luggage box, or rotationally molded container, 44, a vehicle body 46, and a hinged luggage door 48.

Figure 3:
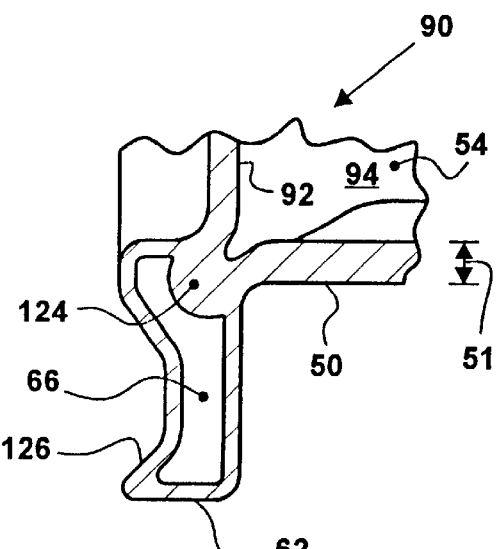
FIG. 3 is a partial cross-sectioned elevation, taken substantially the same as FIG. 2, of the luggage box of FIG. 2 as an unfinished luggage box, as molded, showing the web that encloses the open end of a luggage chamber, and showing the perimetrical chamber that is disposed longitudinally outward and transversely outward from the luggage chamber.
Figure 4:
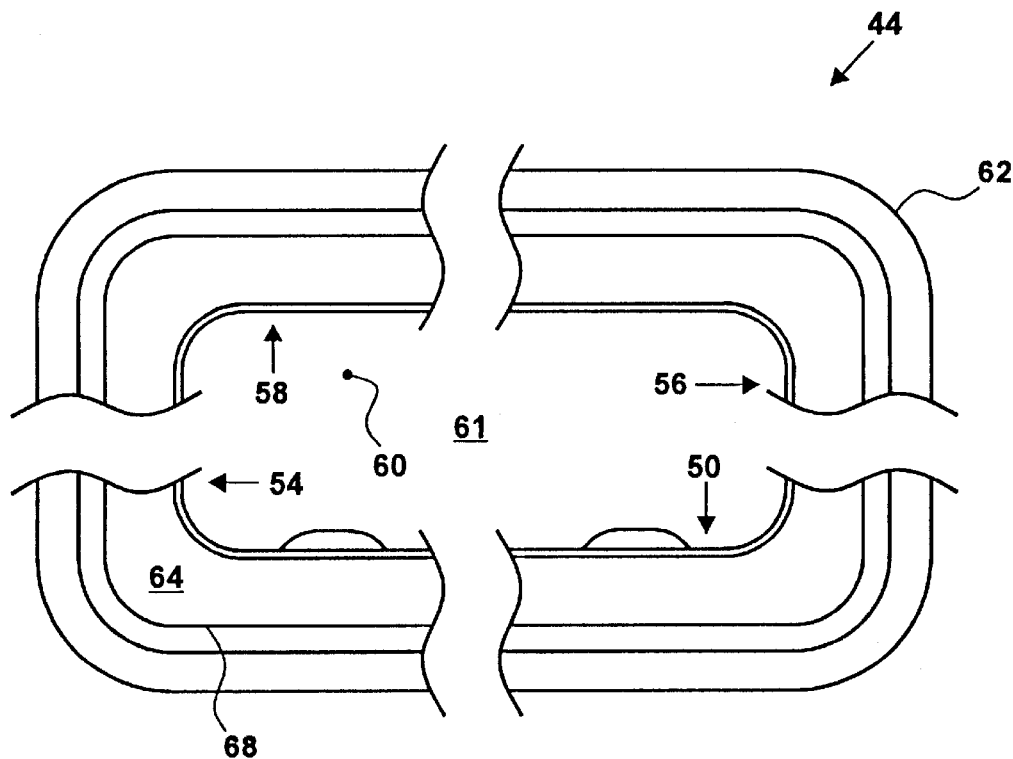
FIG. 4 is an end view, taken substantially as shown by View Line 4—4 of FIG. 2 but in a reduced scale, of the luggage box of FIG. 2.

Referring now to FIGS. 2 and 4, the luggage box 44 includes an open end 49, a ribbed bottom wall, or ribbed floor, 50 with a ribbed floor surface 52, a side wall 54, a side wall 56, a top wall 58, and a closed-end wall 60. As shown in FIG. 3, the bottom wall 50 has a thickness 51. The ribbed floor 50, the side walls 54 and 56, the top wall 58, and the closed-end wall 60 cooperate to provide an open-ended chamber, or luggage compartment, 61 of FIGS. 2 and 4.

Further, the luggage box 44 includes a perimetrical flange or integrally molded flange 62 with a flange surface 64. The perimetrical flange 62 extends downwardly from the floor 50, outwardly from respective ones of said side walls, 54 and 56, and upwardly from the top wall 58.

Referring now to FIG. 2, a perimetrical chamber, or rotationally molded chamber, 66 is perimetrically disposed in the perimetrical flange 62. That is, the perimetrical chamber 66 extends around the floor 50, the side walls 54 and 56, and the top wall 58. A perimetrical groove 68 is disposed in the flange 62, opens into the perimetrical chamber 66, and opens through the flange surface 64. The perimetrical chamber 66 and the perimetrical groove 68 cooperate to provide a perimetrical T-slot 70.

Figure 6:
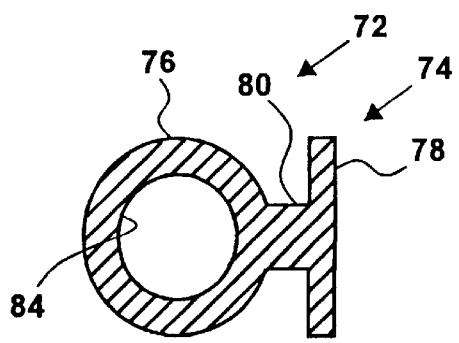
FIG. 6 is a cross section of the gasket of FIG. 2 with T-shaped and tubular portions, taken substantially as shown in FIG. 2.

Referring now to FIGS. 2 and 6, a resilient perimetrical gasket 72, which preferably is extruded from a closed-cell foamed neoprene, includes a T-portion, or T-shaped portion, 74 and a perimetrically disposed tubular portion, or perimetrically disposed compressive-seal portion, 76. The T-portion 74 includes a flange portion 78 that retainably fits into the perimetrical chamber 66, and a beam portion 80 that extends through the perimetrical groove 68 to hold the tubular portion 76 in resilient contact with the perimetrical flange 62.

Preferably, as shown, the perimetrical flange 62, rather than being planar, slopes inwardly toward the perimetrical chamber 66 on both sides of the perimetrical groove 68, thereby providing a stabilizing recess, 82 for stabilizing the tubular portion 76 of the gasket 72.

A tubular opening 84 in the tubular portion 76 increases the resilience of the tubular portion 76 of the gasket 72, thereby providing a highly reliable seal in the face of production variations and accumulations of both snow and ice. With regard to snow and ice, the high degree of deformability of the tubular portion 76 helps to break accumulations of snow or ice during each opening and closing of the luggage door 48.

As shown in FIG. 2, the luggage box 44 is inserted through an opening 85 in the vehicle body 46. The luggage box 44 rests on a support structure 86 proximal to the closed-end wall 60, and is attached to both the vehicle body 46 and the support structure 86 by self-tapping screws 88.

Referring now to FIGS. 2–4, an unfinished luggage box or unfinished container 90 of FIG. 3 includes parts with names and numbers as provided for the luggage box 44 of FIG. 2, except for two details. The unfinished luggage box 90 of FIG. 3 does not include the open-ended chamber 61, nor does it include the perimetrical groove 68. The perimetrical groove 68 is machined into the luggage box 44 subsequent to the molding process. In addition, as molded, the unfinished luggage box 90 includes a front-wall, or web, 92 which is formed as a natural function of the molding process, so that, rather than including the open-ended chamber 61, the unfinished luggage box 90 includes a closed chamber 94. Subsequent to the molding process, the web 92 is removed by a cutting operation, thereby transforming the closed chamber 94 into the openended chamber 61.

Figure 5:
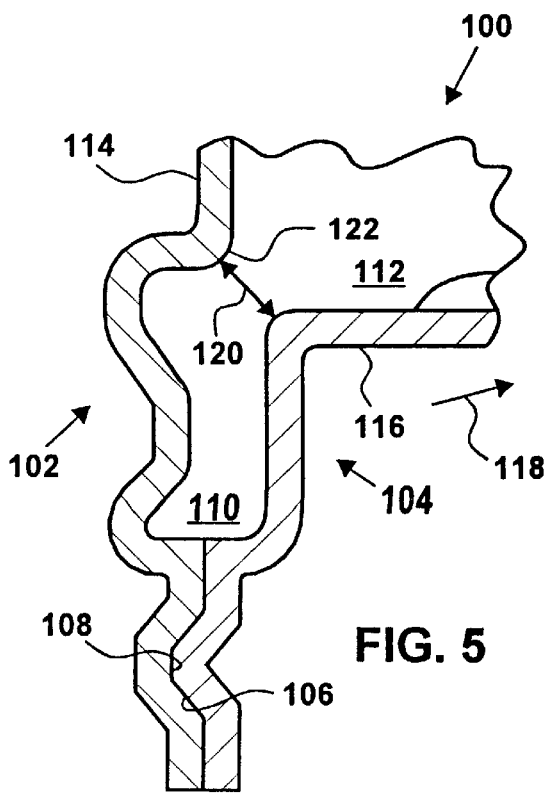
FIG 5 is a partial cross-sectioned elevation of a mold for making the unfinished luggage box of FIGS. 3 and 4, taken substantially the same as 5 FIG. 3.

Referring now to FIG. 5, a mold 100 is shown by a cross-sectioned partial elevation. The mold 100 includes an end cap 102 and a body mold 104 that interlock with a key 106 and a key recess 108.

From the preceding description of FIGS. 2 and 3, it should be apparent that a perimetrical flange-opening 110 molds the perimetrical flange 62 of FIGS. 2 and 3, that a luggage-box opening 112 molds the unfinished luggage box 90 of FIG. 3, and that the web 92 is molded by a plate 114 of the end cap 102. In accordance with molding practice, the mold 100 includes draft. For instance, a bottom wall 116 of the body mold 104 slopes in a direction shown by an arrow 118.

By selectively determining a throat dimension 120 of a throat opening 122 between the body mold 104 and the end cap 102, the molding process results in a perimetrical bridge barrier 124, as shown in FIGS. 2 and 3. Therefore, the present invention teaches means for rotomolding two chambers, the perimetrical chamber 66 and the closed chamber 94, that are sealed one from the other, in the single mold 100.

In addition, as shown in FIGS. 3 and 5, by selectively determining the dimension 120, walls 126 that enclose the perimetrical chamber 66 can be selectively made thinner than other portions of the luggage box 90, such as the thickness 51 of the floor 50 and the web 92.

While specific apparatus and method have been disclosed in the preceding description, and while part numbers have been inserted into the claims, it should be understood that these specifics have been given for the purpose of disclosing the principles of the present invention, and that many variations thereof will become apparent to those who are versed in the art. Therefore, the scope of the present invention is to be determined by the claims included herein.

INDUSTRIAL APPLICABILITY

The present invention is applicable to containers in which a cover thereof must seal reliably, and be highly resistant to failure due to the presence or accumulations of dirt, mud, rain, snow, ice, temperature extremes, and thousands of openings and closings over a number of years.

What is claimed is:

1. A method for making a container with a perimetrical T-slot surrounding an open end thereof, which method comprises:
   a) rotationally molding first walls that enclose a first chamber;
   b) rotationally molding second walls that enclose a perimetrical chamber that is juxtaposed to, but sealed from, said first chamber;
   c) opening an end of said first chamber proximal to said perimetrical chamber; and
   d) perimetrically slotting said perimetrical chamber.

2. A method as claimed in claim 1 in which said method further comprises molding said second walls thinner than said first walls.

3. A method for making a container with a perimetrical gasket surrounding an open end thereof, which method comprises:
   a) rotationally molding first walls that enclose a first chamber;
   b) rotationally molding second walls that enclose a perimetrical chamber that is juxtaposed to, but sealed from, said first chamber;
   c) opening an end of said first chamber proximal to said perimetrical chamber;
   d) perimetrically slotting said perimetrical chamber; and
   e) inserting a gasket perimetrically into said slot.

4. A method as claimed in claim 3 in which said inserting step comprises perimetrically inserting a flange portion of said gasket into said perimetrical chamber with a beam portion of said gasket disposed perimetrically in said slot.

5. A method as claimed in claim 3 in which said inserting step comprises perimetrically inserting a flange portion of said gasket into said perimetrical chamber with a beam portion of said gasket disposed perimetrically in said slot, and with a compressive-seal portion of said gasket disposed outside and perimetrically around said slot.

6. A method as claimed in claim 3 in which said inserting step comprises perimetrically inserting a flange portion of said gasket into said perimetrical chamber with a beam portion of said gasket disposed perimetrically in said slot, and with a tubular portion of said gasket disposed outside and perimetrically around said slot.

7. A method for making a container with a perimetrical T-slot surrounding an open end thereof, which method comprises:
   a) rotationally molding walls that enclose a single chamber;
   b) perimetrically bridging said single chamber into a larger chamber and a perimetrical chamber that are sealingly isolated from each other; and
   c) perimetrically slotting said perimetrical chamber.

8. A method as claimed in claim 7 in which said method further comprises making walls of said larger chamber thicker than walls of said perimetrical chamber.

9. A rotationally-molded container (44) which includes an open-ended chamber (61) having a top wall (58), a bottom wall (50), side walls (54 and 56), a closed-end wall (60), and an open end (49) with a perimetrical flange (62) that extends radially outward from said top, bottom, and side walls, the improvement which comprises:
   a rotationally-molded chamber (66) being perimetrically enclosed in said flange and being isolated from said open-ended chamber; and
   a T-slot (70), comprising said rotationally-molded chamber and a groove (68) that opens perimetrically through said flange and into said rotationally-molded chamber.

10. A container (44) as claimed in claim 9 in which said container further comprises a resilient gasket (72) that is perimetrically disposed in said rotationally-molded chamber (66) and that extends perimetrically through said groove (68).

11. A container (44) as claimed in claim 9 in which said container further comprises a resilient gasket (72) that is perimetrically disposed in said rotationally-molded chamber (66) and that extends perimetrically through said groove (68); and
   said resilient gasket includes a compressive-seal portion (76) that is perimetrically disposed outside said groove.

12. A rotationally-molded container (44) as claimed in claim 9 in which:
   one of said walls (50, 54, 56, 58, 60) has a first thickness (51); and
   said rotationally-molded chamber (66) is enclosed with walls (126) that are molded thinner than said first thickness.

* * * * *

UNITED STATES PATENT AND TRADEMARK OFFICE
CERTIFICATE OF CORRECTION

PATENT NO. : 6,106,053
DATED : August 22, 2000
INVENTOR(S) : Carl W. Van Gilst and Ronald E. Kish It is certified that error appears in the above-identified patent and that said Letters Patent is hereby corrected as shown below:

Title page,
Item [73] should read -- Assignee: Behlen Engineered Plastics Goshen, IN --

Column 2,
Line 63, delete "/" between "tubular" and "portion"

Column 3,
Line 6, insert "," after "Fig. 2"
Line 10, delete "5" after "as"
Line 50, insert "," after "flange"
Line 51, insert "-" between "integrally" and "molded" and insert "," between "flange" and "62"

Column 4,
Line 25, insert "," between "box" and "or"
Line 26, insert "," between "container" and "90"
Line 39, insert "-" between "open" and "ended"

Signed and Sealed this

Twenty-fifth Day of September, 2001

Attest:

NICHOLAS P. GODICI
Attesting Officer
Acting Director of the United States Patent and Trademark Office